(12) United States Patent
Liu

(10) Patent No.: US 9,806,590 B2
(45) Date of Patent: Oct. 31, 2017

(54) PERMANENT MAGNET MOTOR HAVING REDUCED TORQUE RIPPLE

(71) Applicant: Zhongshan Broad-Ocean Motor Co., Ltd., Zhongshan (CN)

(72) Inventor: Changhong Liu, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 268 days.

(21) Appl. No.: 14/840,042

(22) Filed: Aug. 30, 2015

(65) Prior Publication Data
US 2015/0372579 A1 Dec. 24, 2015

Related U.S. Application Data

(63) Continuation-in-part of application No. PCT/CN2014/073542, filed on Mar. 17, 2014.

(30) Foreign Application Priority Data

Nov. 12, 2013 (CN) .................... 2013 2 0712610 U

(51) Int. Cl.
H02K 29/03 (2006.01)
H02K 1/27 (2006.01)
H02K 1/08 (2006.01)
H02K 1/16 (2006.01)
H02K 1/26 (2006.01)

(52) U.S. Cl.
CPC .............. H02K 29/03 (2013.01); H02K 1/08 (2013.01); H02K 1/16 (2013.01); H02K 1/26 (2013.01); H02K 1/274 (2013.01); H02K 1/278 (2013.01); H02K 1/2746 (2013.01); H02K 1/2773 (2013.01); H02K 2201/03 (2013.01)

(58) Field of Classification Search
CPC ...... H02K 1/08; H02K 1/16; H02K 1/27–1/2793; H02K 29/03; H02K 2201/03
USPC ....................................................... 310/156.83
See application file for complete search history.

(56) References Cited

U.S. PATENT DOCUMENTS

2007/0138891 A1* 6/2007 Hurst ..................... H02K 1/278
310/156.28
2013/0057103 A1* 3/2013 Han ..................... H02K 1/2773
310/156.12

* cited by examiner

Primary Examiner — Ramon M Barrera
(74) Attorney, Agent, or Firm — Matthias Scholl, PC; Matthias Scholl

(57) ABSTRACT

A permanent magnet motor, including: a stator assembly and a rotor assembly. The stator assembly includes: a stator core and a coil winding. The stator core includes: a yoke portion, a plurality of tooth portions, and a plurality of winding slots. The rotor assembly includes: a rotor core, a plurality of permanent magnets, and a rotor sheath. The tooth portions are extended out of the yoke portion. Each winding slot is formed between adjacent tooth portions. The permanent magnets are disposed at intervals on a surface of the rotor core and magnetic poles of two facing sides of adjacent permanent magnets are the same. The rotor sheath is disposed outside the rotor assembly and is divided into at least two segments axially. A magnetic conductivity of a first segment of the rotor sheath is different from a magnetic conductivity of a second segment of the rotor sheath.

19 Claims, 5 Drawing Sheets

PERMANENT MAGNET MOTOR HAVING REDUCED TORQUE RIPPLE

CROSS-REFERENCE TO RELATED APPLICATIONS

This application is a continuation-in-part of International Patent Application No. PCT/CN2014/073542 with an international filing date of Mar. 17, 2014, designating the United States, now pending, and further claims priority benefits to Chinese Patent Application No. 201320712610.5 filed Nov. 12, 2013. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, and Cambridge, Mass. 02142.

BACKGROUND OF THE INVENTION

Field of the Invention

The invention relates to a permanent magnet motor having reduced torque ripple.

Description of the Related Art

Typical measures to decrease torque ripple include: stator slot skewing, rotor step skewing, stator teeth notching, arc modification on the rotor surface. However, the application of the stator slot skewing or the rotor step skewing is limited to concentrated winding with relatively few slots. This is because the fewer the number of slots, the larger the axial misalignment angle that is required, which translates to a large decrease in the fundamental wave torque.

Also, although the stator teeth notching and the arc modification on the rotor surface improve the cogging torque ripple of the stator, the effect on the sixth-harmonic ripple, which is the most important to reducing the total torque ripple, is small.

SUMMARY OF THE INVENTION

In view of the above-described problems, it is one objective of the invention to provide a permanent magnet motor adapted to reduce torque ripple of a surface mounted permanent magnet rotor thereof. The permanent magnet motor has compact structure, small torque ripple, high fundamental wave torque, and smooth operation, and is easy to practice.

To achieve the above objective, in accordance with one embodiment of the invention, there is provided a permanent magnet motor adapted to reduce the torque ripple of a surface mounted permanent magnet rotor thereof. The permanent magnet motor comprises: a stator assembly and a rotor assembly. The stator assembly comprises: a stator core and a coil winding. The stator core comprises: a yoke portion, a plurality of tooth portions, and a plurality of winding slots. The rotor assembly comprises: a rotor core, a plurality of permanent magnets, and a rotor sheath. The tooth portions are extended out of the yoke portion. Each winding slot is formed between adjacent tooth portions. The permanent magnets are disposed at intervals on a surface of the rotor core and magnetic poles of two facing sides of adjacent permanent magnets are the same. The rotor sheath is disposed outside the rotor assembly and is divided into at least two segments axially. A magnetic conductivity of a first segment of the rotor sheath is different from a magnetic conductivity of a second segment of the rotor sheath.

In a class of this embodiment, the first segment of the rotor sheath is made of a magnetic material, and the second segment of the sheath is made of a nonmagnetic material.

In a class of this embodiment, two sides of an inner surface of a crown on each tooth portion are cut to form grooves.

In a class of this embodiment, the permanent magnet is a salient-pole surface mounted permanent magnet.

In a class of this embodiment, a ratio of a number of the winding slots to a number of pole-pairs of the permanent magnets is a fraction.

In a class of this embodiment, the stator assembly is a fractional-slot strip stator assembly.

In a class of this embodiment, the rotor assembly is an inner rotor assembly or an outer rotor assembly.

In a class of this embodiment, the ratio of the number of the winding slots to a pole number of the permanent magnets is 18:14.

In a class of this embodiment, the first segment of the rotor sheath has the same radial thickness and axial length as the second segment of the sheath.

Compared with existing technologies, advantages of the permanent magnet motor according to embodiments of the invention are given below:

1. The rotor assembly comprises the rotor core and a plurality of the permanent magnets disposed on the surface thereof. The rotor sheath is disposed outside the rotor assembly and is divided into at least two segments axially. The magnetic conductivity of the first segment of the rotor sheath is different from the magnetic conductivity of the second segment of the rotor sheath. Compared with the sheath made of nonmagnetic materials, the magnetic field in the sheath made of magnetic materials shows a skewed distribution to some extent because of the magnetic conductivity of the magnetic materials. By a proper design, a fifth-harmonic and a seventh-harmonic magnetic fields penetrate through two types of rotor sheathes and form an antiphase angle, so that the torque ripple produced by the two segments of the rotor assembly causes a back reaction, thus reducing the overall torque ripple, largely decreasing sixth-harmonic torque, and the fundamental torque loss weight being small.

2. Two sides of an inner surface of a crown on each tooth portion are cut to form grooves, thus changing the distribution of an air-gap permeance, further decreasing the torque ripple.

3. The permanent magnet is a salient-pole surface mounted permanent magnet, thus increasing a flux density waveform of a rotor field, leading to a certain increase to the output torque of the motor.

4. The ratio of a number of the winding slots to a number of pole-pairs of the permanent magnets is a fraction. The concentrated winding fractional slot is employed to minimize the total axial length, thus reducing volume, decreasing cost and further decreasing the torque ripple.

5. The rotor sheath is divided into at least two segments axially, and the first segment of the rotor sheath is made of the magnetic material, and the second segment of the sheath is made of the nonmagnetic material. The rotor sheath features a compact structure and is easy to select materials.

DETAILED DESCRIPTION OF THE EMBODIMENTS

Figure 1:
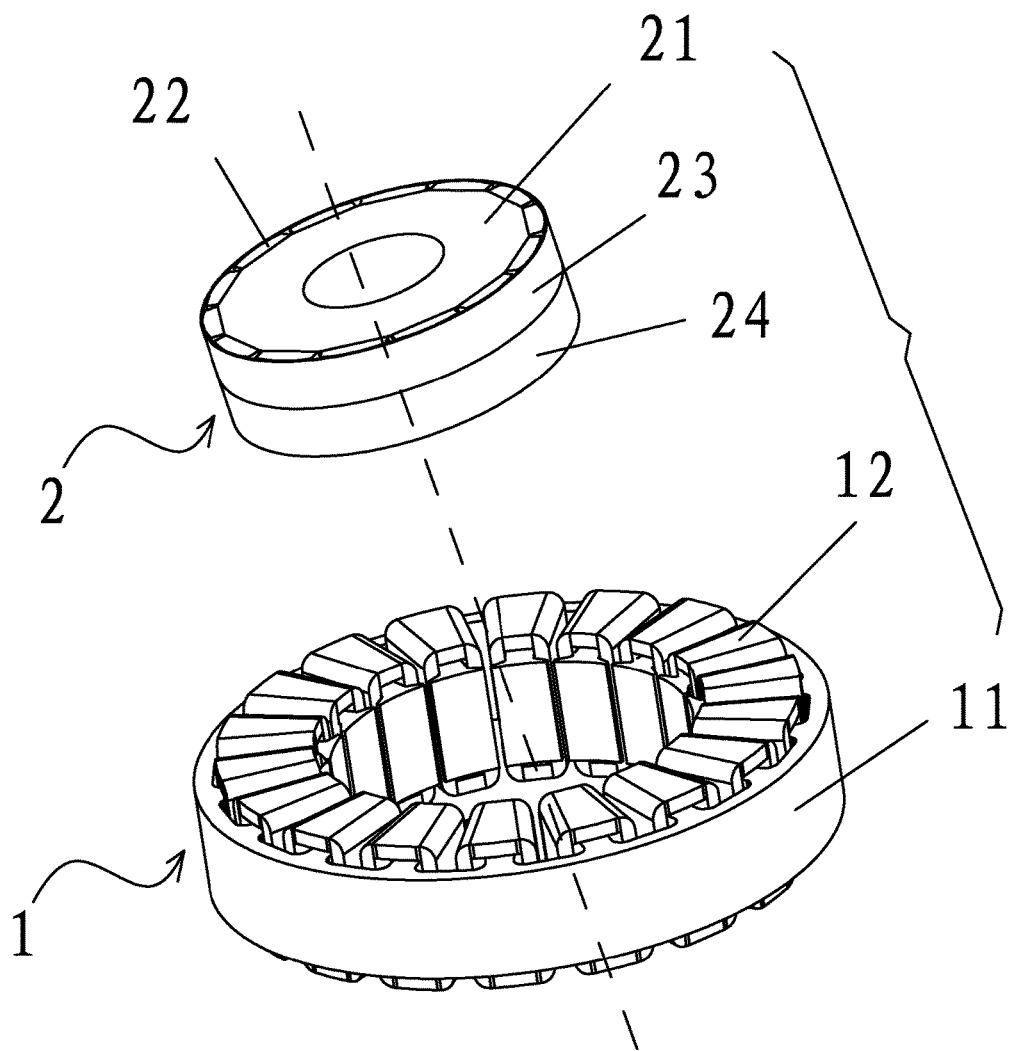
FIG. 1 is an exploded view of a permanent magnet motor adapted to reduce torque ripple of a surface mounted permanent magnet rotor thereof in example 1.
Figure 2:
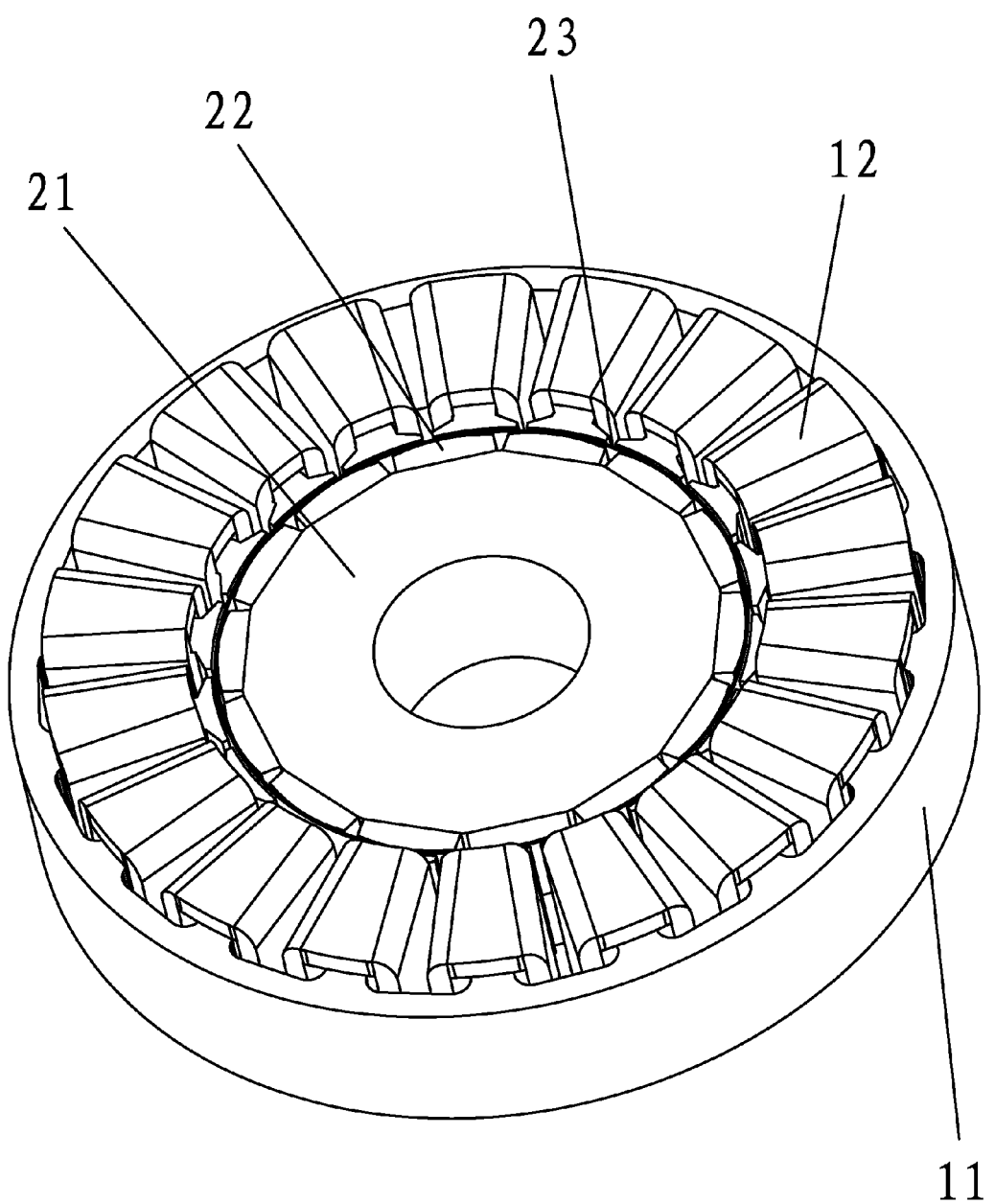
FIG. 2 is a stereogram of a permanent magnet motor adapted to reduce torque ripple of a surface mounted permanent magnet rotor thereof in example 1.
Figure 3:
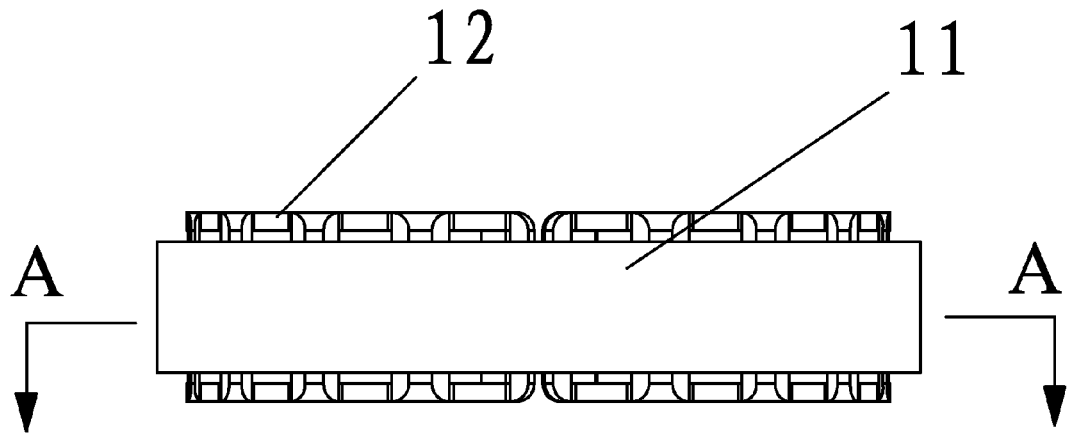
FIG. 3 is a side view of a permanent magnet motor adapted to reduce torque ripple of a surface mounted permanent magnet rotor thereof in example 1.
Figure 4:
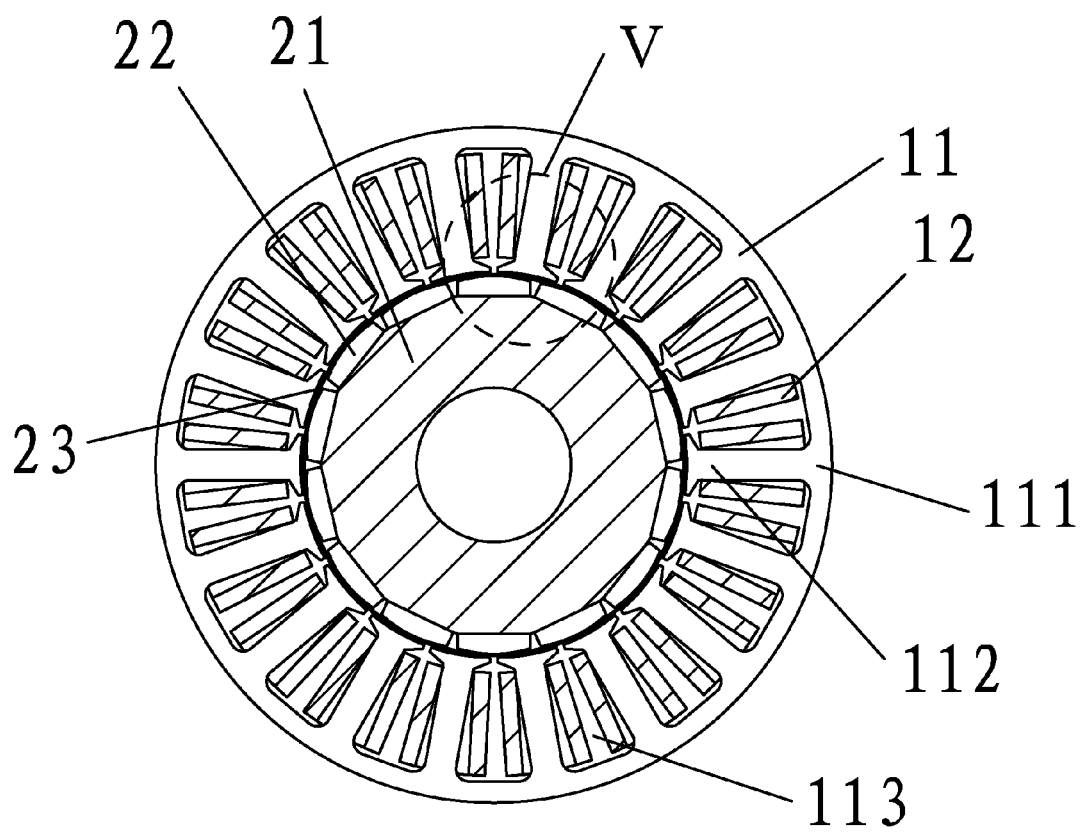
FIG. 4 is a cross-sectional view taken from line A-A in FIG. 3.
Figure 5:
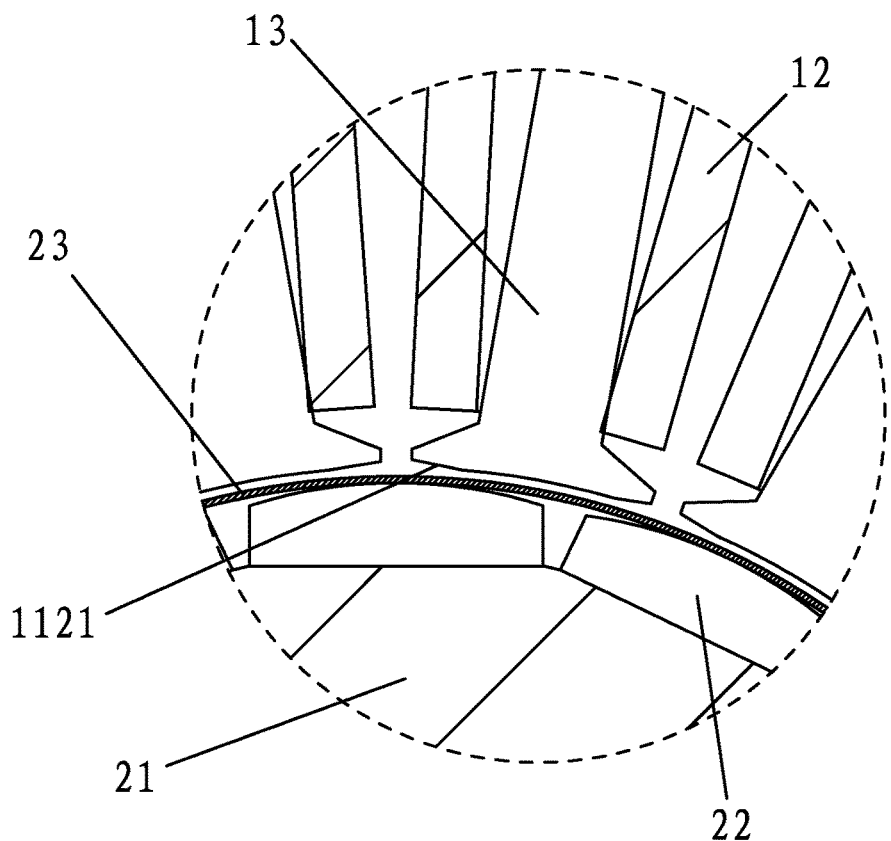
FIG. 5 is a partial enlarged view of FIG. 4.
Figure 6:
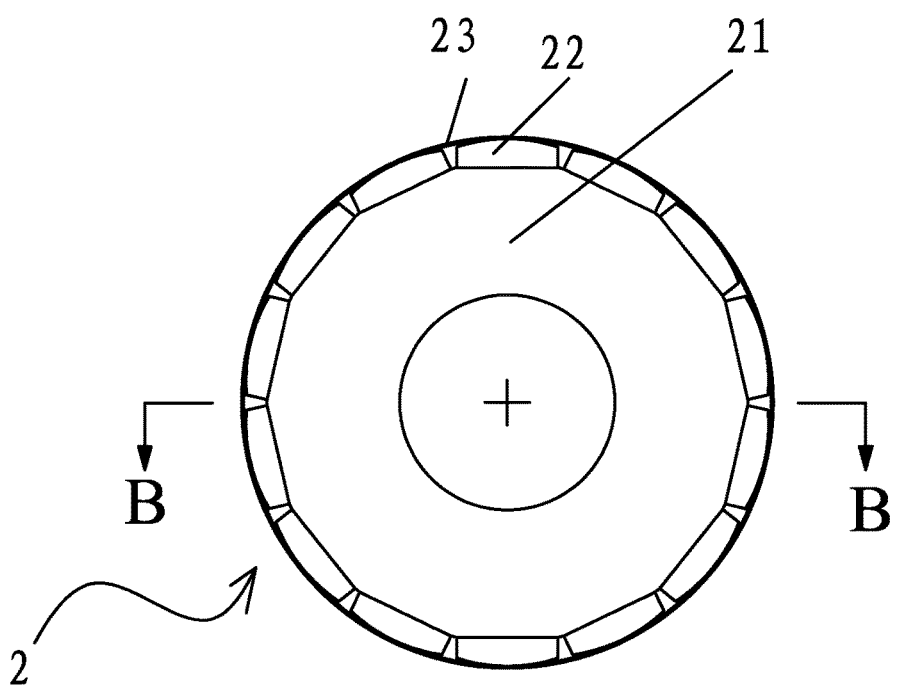
FIG. 6 is a top view of a rotor of a permanent magnet motor in example 1.
Figure 7:
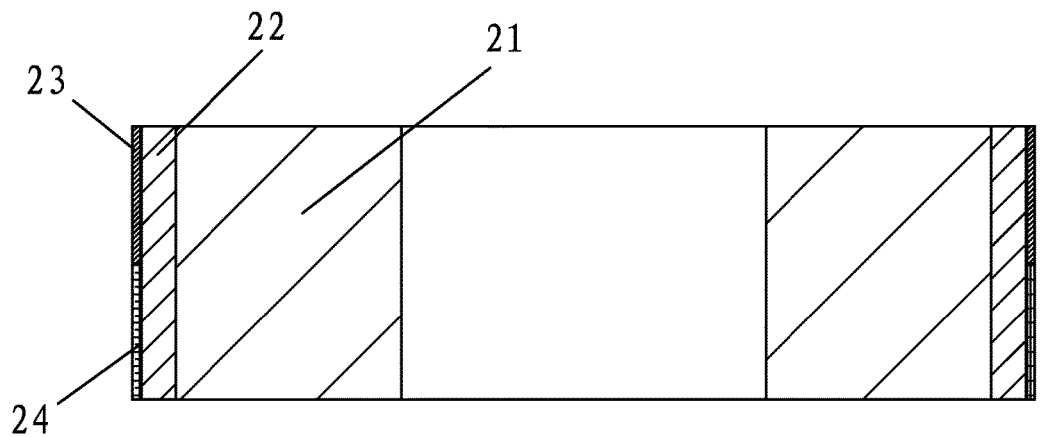
FIG. 7 is a cross-sectional view taken from line B-B in FIG. 6.

For further illustrating the invention, experiments detailing a permanent magnet motor adapted to reduce torque ripple of a surface mounted permanent magnet rotor thereof are described below. It should be noted that the following examples are intended to describe and not to limit the invention.

EXAMPLE 1

As shown in FIGS. 1-7, a permanent magnet motor adapted to reduce the torque ripple of a surface mounted permanent magnet rotor thereof, comprises: a stator assembly 1 and a rotor assembly 2. The stator assembly 1 comprises a stator core 11 and a coil winding 12. The stator core 11 comprises a yoke portion 111 and a plurality of tooth portions 112 extending out of the yoke portion. Winding slots 113 are formed between adjacent tooth portions 111. The rotor assembly 2 comprises a rotor core 21 and a plurality of permanent magnets 22 disposed on the surface thereof. The permanent magnets are disposed at intervals on a surface of the rotor core and magnetic poles of two facing sides of adjacent permanent magnets are the same. A rotor sheath is disposed outside the rotor assembly 2 and is divided into at least two segments axially. The magnetic conductivity of the first segment of the rotor sheath 23 is different from the magnetic conductivity of the second segment of the rotor sheath 24. The first segment 23 is a sheath made of magnetic materials, and the second segment 24 is a sheath made of nonmagnetic materials. Two sides of an inner surface of a crown on each tooth portion 112 are cut to form grooves 1121. The permanent magnet 22 is a salient-pole surface mounted permanent magnet. A ratio of a number of the winding slots 113 to a number of pole-pairs of the permanent magnets 22 is a fraction. The stator assembly 1 is a fractional-slot strip stator assembly. The rotor assembly is an inner rotor assembly or an outer rotor assembly. The ratio of the number of the winding slots 113 to a number of pole-pairs of the permanent magnets is 18:7. The first segment of the rotor sheath has the same radial thickness and axial length as the second segment of the sheath.

EXAMPLE 2

Figure 8:
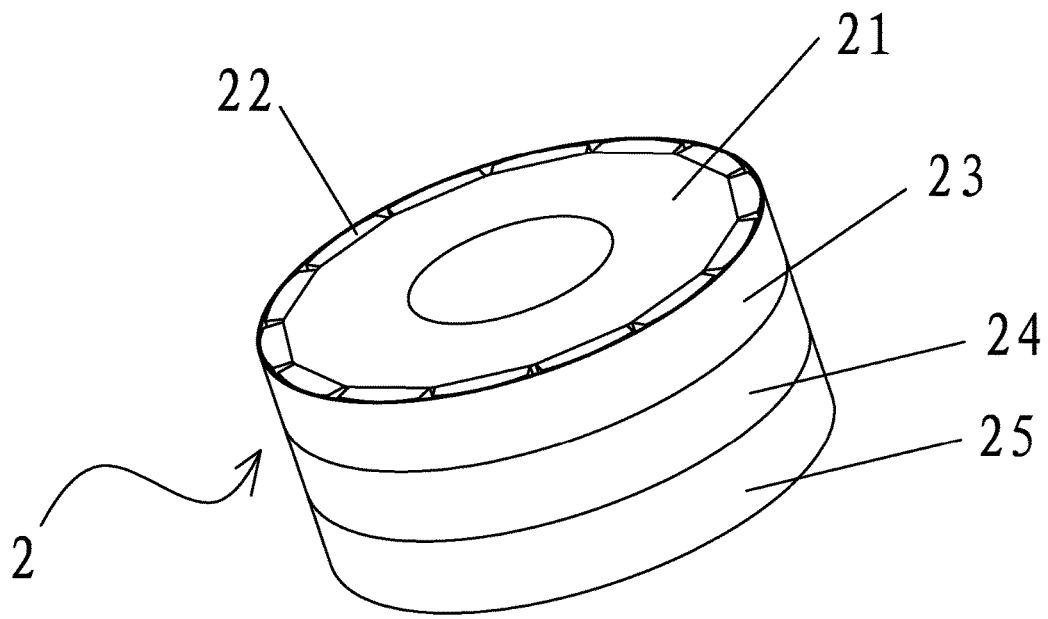
FIG. 8 is a stereogram of a rotor of a permanent magnet motor in example 2.

As shown in FIG. 8, the example is an improvement of example 1, and the structure thereof is similar to that in example 1. The improvement is that: a rotor sheath is divided into three segments axially; and the magnetic conductivities of the first segment of the rotor sheath 23, the second segment of the rotor sheath 24, and the third segment of the rotor sheath 25 are different from one another and decrease respectively.

In the invention, the rotor sheath is divided into at least two segments axially; and the magnetic conductivity of the first segment of the rotor sheath 23 is different from the magnetic conductivity of the second segment of the rotor sheath 24, and the magnetic conductivities of different segments of the rotor sheath decrease in order. The rotor sheath features a compact structure and is easy to realize. Compared with a field in an air-gap performance and the sheath made of nonmagnetic materials, magnetic field of the sheath made of magnetic materials, as magnetic materials feature magnetic conductivity, shows a skewed distribution. The fields penetrate through two types of rotor sheath and form an antiphase angle, so that the torque ripple produced by the two segments of the rotor assembly causes a back reaction, thus reducing the overall torque ripple, largely decreasing sixth-harmonic torque and the fundamental torque loss weight being big. In addition, reducing torque ripple of a surface mounted permanent magnet rotor thereof works best when the first segment of the rotor sheath has the same radial thickness and axial length as the second segment of the sheath. Two sides of an inner surface of a crown on each tooth portion 112 are cut to form grooves 1121, thus changing the distribution of air-gap permeance, further decreasing the torque ripple. The permanent magnet 22 is the salient-pole surface mounted permanent magnet, thus increasing the flux density waveform of the rotor field, leading to a certain increase to the output torque of the motor. A ratio of the number of the winding slots 113 to the number of pole-pairs of the permanent magnets 22 is a fraction. A design of concentrated winding fractional slot is employed to minimize the total axial length, thus reducing volume, decreasing cost and further decreasing torque ripple.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A permanent magnet motor, comprising:
    a) a stator assembly, the stator assembly comprising: a stator core and a coil winding; the stator core comprising: a yoke portion, a plurality of tooth portions, and a plurality of winding slots; and
    b) a rotor assembly, the rotor assembly comprising: a rotor core, a plurality of permanent magnets, and a rotor sheath;

wherein
        the tooth portions are extended out of the yoke portion;
        each winding slot is formed between adjacent tooth portions;
        the permanent magnets are disposed at intervals on a surface of the rotor core and magnetic poles of two facing sides of adjacent permanent magnets are the same;
        the rotor sheath is disposed outside the rotor assembly and is divided into at least two segments axially; and
        a magnetic conductivity of a first segment of the rotor sheath is different from a magnetic conductivity of a second segment of the rotor sheath.

2. The permanent magnet motor of claim 1, wherein the first segment of the rotor sheath is made of a magnetic material, and the second segment of the sheath are made of a nonmagnetic material.

3. The permanent magnet motor of claim 2, wherein two sides of an inner surface of a crown on each tooth portion are cut to form grooves.

4. The permanent magnet motor of claim 1, wherein the permanent magnet is a salient-pole surface mounted permanent magnet.

5. The permanent magnet motor of claim 2, wherein the permanent magnet is a salient-pole surface mounted permanent magnet.

6. The permanent magnet motor of claim 3, wherein the permanent magnet is a salient-pole surface mounted permanent magnet.

7. The permanent magnet motor of claim 4, wherein a ratio of a number of the winding slots to a number of pole-pairs of the permanent magnets is a fraction.

8. The permanent magnet motor of claim 5, wherein a ratio of a number of the winding slots to a number of pole-pairs of the permanent magnets is a fraction.

9. The permanent magnet motor of claim 6, wherein a ratio of a number of the winding slots to a number of pole-pairs of the permanent magnets is a fraction.

10. The permanent magnet motor of claim 7, wherein the stator assembly is a fractional-slot strip stator assembly.

11. The permanent magnet motor of claim 8, wherein the stator assembly is a fractional-slot strip stator assembly.

12. The permanent magnet motor of claim 9, wherein the stator assembly is a fractional-slot strip stator assembly.

13. The permanent magnet motor of claim 7, wherein the rotor assembly is an inner rotor assembly or an outer rotor assembly.

14. The permanent magnet motor of claim 8, wherein the rotor assembly is an inner rotor assembly or an outer rotor assembly.

15. The permanent magnet motor of claim 9, wherein the rotor assembly is an inner rotor assembly or an outer rotor assembly.

16. The permanent magnet motor of claim 7, wherein a ratio of the number of the winding slots to a pole number of the permanent magnets is 18:14.

17. The permanent magnet motor of claim 8, wherein a ratio of the number of the winding slots to a pole number of the permanent magnets is 18:14.

18. The permanent magnet motor of claim 9, wherein a ratio of the number of the winding slots to a pole number of the permanent magnets is 18:14.

19. The permanent magnet motor of claim 2, wherein the first segment of the rotor sheath has the same radial thickness and axial length as the second segment of the sheath.

* * * * *